United States Patent
Sharma

(10) Patent No.: US 7,199,905 B2
(45) Date of Patent: Apr. 3, 2007

(54) SYSTEMS AND METHODS FOR HALFTONING MULTIPLE COLOR SEPARATION LAYERS BY INTERLAYER ERROR DIFFUSION

(75) Inventor: Gaurav Sharma, Webster, NY (US)

(73) Assignee: Xerox Corporation, Stamford, CT (US)

(*) Notice: Subject to any disclaimer, the term of this patent is extended or adjusted under 35 U.S.C. 154(b) by 1015 days.

(21) Appl. No.: 10/000,487

(22) Filed: Dec. 4, 2001

(65) Prior Publication Data

US 2003/0103241 A1 Jun. 5, 2003

(51) Int. Cl.
  *H04N 1/40* (2006.01)
  *H04N 1/405* (2006.01)
  *G06K 15/00* (2006.01)
(52) U.S. Cl. ............... 358/3.04; 358/3.01; 358/3.03; 358/3.06
(58) Field of Classification Search ........... 358/3.01, 358/3.03, 3.04, 3.06; 382/252
See application file for complete search history.

(56) References Cited

U.S. PATENT DOCUMENTS

| | | | | |
|---|---|---|---|---|
| 5,210,602 A | * | 5/1993 | Mintzer | 358/518 |
| 5,467,201 A | * | 11/1995 | Fan | 358/447 |
| 5,565,994 A | * | 10/1996 | Eschbach | 358/3.03 |
| 5,784,496 A | * | 7/1998 | Mantell | 382/237 |
| 5,949,965 A | * | 9/1999 | Gondek | 358/1.9 |
| 6,072,591 A | | 6/2000 | Harrington | 358/1.9 |
| 6,089,691 A | | 7/2000 | Kakutani | 347/15 |
| 6,157,462 A | | 12/2000 | Fan | 358/1.9 |
| 6,501,564 B1 | * | 12/2002 | Schramm et al. | 358/1.9 |

FOREIGN PATENT DOCUMENTS

| | | |
|---|---|---|
| EP | 0 501 023 A2 | 9/1992 |
| EP | 0 501 023 A3 | 9/1992 |

OTHER PUBLICATIONS

R.W. Floyd et al., "An Adaptive Algorithm for Spatial Greyscale," *Proceedings of the Society of Information Display*, vol. 17, pp. 75-77, 1976.

A. Kumar et al., "On the Phase Response of the Error Diffusion Filter for Image Halftoning," *IEEE Transaction on Image Processing*, vol. 8, pp. 1282-1292, Sep. 1999.

(Continued)

*Primary Examiner*—David Moore
*Assistant Examiner*—James A. Thompson
(74) *Attorney, Agent, or Firm*—Oliff & Berridge, PLC

(57) ABSTRACT

Error diffusion halftoning systems and methods propagate the error both within a color layer and between the color layer being halftoned and subsequent color layers yet to be halftoned. Threshold array halftoning systems and methods diffuse error to subsequent color layers after a color layer has been halftoned using a threshold array. A color continuous tone image is separated into color layers. A plurality of weighting factors are selected that control how error is diffused to subsequent color layers as each color layer is halftoned. A first color layer is halftoned using error diffusion or threshold array halftoning. An error layer is generated from the first halftoned color layer and the first color layer. A modified second continuous tone color layer is generated based on at least one error layer and the corresponding weighting factor. That modified second continuous tone color layer is then halftoned and the process is repeated.

23 Claims, 19 Drawing Sheets

OTHER PUBLICATIONS

D. Venable et al., "Selection and Use of Small Color Sets for Pictorial Display", *Proceedings of the IS&T Meeting*, Rochester New York, 1990.

R. Miller et al., "Color Halftoning Using Error Diffusion and a Human Visual System Model", *Proceedings of the IS&T Meeting*, Rochester New York, 1990.

* cited by examiner

*100*

*102* *110* *120*

| 255 | 252 | 249 | 246 | 243 | 240 | 237 | 239 |
|-----|-----|-----|-----|-----|-----|-----|-----|
| 232 | 229 | 226 | 223 | 220 | 217 | 214 | 211 |
| 208 | 205 | 202 | 199 | 196 | 193 | 191 | 188 |
| 185 | 182 | 179 | 176 | 173 | 170 | 167 | 164 |
| 161 | 158 | 155 | 152 | 149 | 147 | 144 | 141 |
| 138 | 135 | 132 | 129 | 126 | 123 | 120 | 117 |
| 114 | 111 | 108 | 106 | 103 | 100 | 97  | 94  |
| 91  | 88  | 85  | 82  | 79  | 76  | 73  | 70  |
| 67  | 64  | 62  | 59  | 56  | 53  | 50  | 47  |
| 44  | 41  | 38  | 35  | 32  | 29  | 26  | 23  |
| 21  | 18  | 15  | 12  | 9   | 6   | 3   | 0   |

| 29 | 65 | 94 | 126 | 158 | 191 | 223 | 255 |
|----|----|----|-----|-----|-----|-----|-----|
| 26 | 59 | 91 | 123 | 155 | 188 | 220 | 252 |
| 23 | 56 | 88 | 120 | 152 | 185 | 217 | 249 |
| 21 | 53 | 85 | 117 | 149 | 182 | 214 | 246 |
| 18 | 50 | 82 | 114 | 147 | 179 | 211 | 243 |
| 15 | 47 | 79 | 111 | 144 | 176 | 208 | 240 |
| 12 | 44 | 76 | 108 | 141 | 173 | 205 | 237 |
| 9  | 41 | 73 | 106 | 138 | 170 | 202 | 234 |
| 6  | 38 | 70 | 103 | 135 | 167 | 199 | 232 |
| 3  | 35 | 67 | 100 | 132 | 164 | 196 | 229 |
| 0  | 32 | 64 | 97  | 129 | 161 | 193 | 226 |

*140* *130*

| 226 | 193 | 161 | 129 | 97  | 64 | 32 | 0  |
|-----|-----|-----|-----|-----|----|----|----|
| 229 | 196 | 164 | 132 | 100 | 67 | 35 | 3  |
| 232 | 199 | 167 | 135 | 103 | 70 | 38 | 6  |
| 234 | 202 | 170 | 138 | 106 | 73 | 41 | 9  |
| 237 | 205 | 173 | 141 | 108 | 76 | 44 | 12 |
| 240 | 208 | 176 | 144 | 111 | 79 | 47 | 15 |
| 243 | 211 | 179 | 147 | 114 | 82 | 50 | 18 |
| 248 | 214 | 182 | 149 | 117 | 85 | 53 | 21 |
| 249 | 217 | 185 | 152 | 120 | 88 | 56 | 23 |
| 252 | 220 | 188 | 155 | 123 | 91 | 59 | 26 |
| 255 | 223 | 191 | 158 | 126 | 94 | 62 | 29 |

| 0   | 3   | 6   | 9   | 12  | 15  | 18  | 21  |
|-----|-----|-----|-----|-----|-----|-----|-----|
| 23  | 26  | 29  | 32  | 35  | 38  | 41  | 44  |
| 47  | 50  | 53  | 56  | 59  | 62  | 64  | 67  |
| 70  | 73  | 76  | 79  | 82  | 85  | 88  | 91  |
| 94  | 97  | 100 | 103 | 106 | 108 | 111 | 114 |
| 117 | 120 | 123 | 126 | 129 | 132 | 135 | 138 |
| 141 | 144 | 147 | 149 | 152 | 155 | 158 | 161 |
| 164 | 167 | 170 | 173 | 176 | 179 | 182 | 185 |
| 188 | 191 | 193 | 196 | 199 | 202 | 205 | 208 |
| 211 | 214 | 217 | 220 | 223 | 226 | 229 | 232 |
| 234 | 237 | 240 | 243 | 246 | 249 | 252 | 255 |

| 255 | 255 | 255 | 255 | 255 | 255 | 255 | 255 |
|-----|-----|-----|-----|-----|-----|-----|-----|
| 255 | 0 | 255 | 255 | 255 | 255 | 255 | 255 |
| 0 | 255 | 255 | 255 | 255 | 0 | 255 | 255 |
| 255 | 0 | 255 | 255 | 0 | 255 | 255 | 0 |
| 255 | 255 | 0 | 255 | 0 | 255 | 0 | 255 |
| 255 | 0 | 255 | 0 | 255 | 0 | 255 | 0 |
| 0 | 255 | 0 | 255 | 0 | 255 | 0 | 0 |
| 255 | 0 | 0 | 255 | 0 | 0 | 255 | 0 |
| 0 | 0 | 255 | 0 | 0 | 0 | 0 | 255 |
| 0 | 0 | 0 | 0 | 0 | 0 | 255 | 0 |
| 0 | 0 | 0 | 0 | 0 | 0 | 0 | 0 |

| 0 | -3 | -6 | -9 | -12 | -15 | -18 | -21 |
|---|---|---|---|---|---|---|---|
| -23 | 229 | -29 | -32 | -35 | -38 | -41 | -44 |
| 208 | -50 | -53 | -56 | -59 | 193 | -64 | -67 |
| -70 | 182 | -76 | -79 | 173 | -85 | -88 | 164 |
| -94 | -97 | 155 | -103 | 149 | -108 | 144 | -114 |
| -117 | 135 | -123 | 129 | -129 | 123 | -135 | 117 |
| 114 | -144 | 108 | -149 | 103 | -155 | 97 | 94 |
| -164 | 88 | 85 | -173 | 79 | 76 | -182 | 70 |
| 67 | 64 | -193 | 59 | 56 | 53 | 50 | -208 |
| 44 | 41 | 38 | 35 | 32 | 29 | -229 | 23 |
| 21 | 18 | 15 | 12 | 9 | 6 | 3 | 0 |

| 29 | 62 | 88 | 117 | 170 | 176 | 205 | 234 |
|---|---|---|---|---|---|---|---|
| 3 | 288 | 62 | 91 | 120 | 150 | 179 | 208 |
| 231 | 6 | 35 | 64 | 93 | 378 | 153 | 182 |
| -49 | 235 | 9 | 38 | 322 | 97 | 126 | 410 |
| -76 | -47 | 237 | 11 | 296 | 71 | 355 | 129 |
| -102 | 182 | -44 | 240 | 15 | 299 | 73 | 357 |
| 126 | -100 | 284 | -41 | 244 | 18 | 302 | 331 |
| -155 | 129 | 158 | -67 | 217 | 246 | 20 | 314 |
| 73 | 102 | -123 | 162 | 191 | 220 | 249 | 24 |
| 47 | 76 | 105 | 135 | 164 | 193 | -33 | 252 |
| 21 | 50 | 79 | 109 | 138 | 167 | 196 | 226 |

| 0 | 0 | 255 | 0 | 255 | 255 | 0 | 255 |
|---|---|---|---|---|---|---|---|
| 0 | 255 | 255 | 0 | 0 | 255 | 255 | 255 |
| 0 | 0 | 255 | 0 | 0 | 255 | 255 | 255 |
| 0 | 255 | 0 | 0 | 255 | 255 | 0 | 255 |
| 0 | 0 | 255 | 0 | 255 | 0 | 255 | 255 |
| 0 | 0 | 0 | 255 | 0 | 255 | 255 | 255 |
| 0 | 0 | 255 | 0 | 255 | 0 | 255 | 255 |
| 0 | 0 | 255 | 0 | 255 | 255 | 0 | 255 |
| 0 | 255 | 0 | 0 | 0 | 255 | 255 | 0 |
| 255 | 0 | 0 | 255 | 0 | 255 | 0 | 255 |
| 0 | 0 | 255 | 0 | 255 | 0 | 255 | 255 |

| 29   | 62   | -161 | 126  | -97  | -64  | 223  | 0   |
|------|------|------|------|------|------|------|-----|
| 26   | -196 | -164 | 123  | 155  | -67  | -35  | -3  |
| 23   | 56   | -167 | 120  | 152  | -70  | -38  | -6  |
| 21   | -202 | 85   | 117  | -106 | -73  | 214  | -9  |
| 18   | 50   | -173 | 114  | -108 | 179  | -44  | -12 |
| 15   | 47   | 79   | -144 | 144  | -79  | -47  | -15 |
| 12   | 44   | -179 | 108  | -114 | 173  | -50  | -18 |
| 9    | 41   | -182 | 106  | -117 | -85  | 202  | -21 |
| 6    | -217 | 70   | 103  | 135  | -88  | 199  | -23 |
| -252 | 35   | 67   | -155 | 132  | -91  | 196  | -26 |
| 0    | 32   | -191 | 97   | -126 | 161  | -62  | -29 |

| 29 | 65 | -155 | 134 | -85 | -49 | 241 | 21 |
|----|----|----|----|----|----|----|----|
| 49 | -170 | -135 | 155 | 190 | -29 | 6 | 41 |
| 70 | 106 | -114 | 176 | 211 | -8 | -26 | -61 |
| 91 | -129 | 161 | 196 | -24 | 12 | 302 | 82 |
| 112 | 147 | -73 | 217 | -2 | 287 | -67 | 102 |
| 132 | 167 | 202 | -18 | 273 | 53 | 88 | 123 |
| 143 | 188 | -32 | 257 | 38 | 328 | 108 | 143 |
| 173 | 208 | -12 | 279 | 59 | 94 | 384 | 164 |
| 194 | -26 | 263 | 299 | 334 | 114 | 404 | 185 |
| -41 | 249 | 284 | 75 | 355 | 135 | 425 | 206 |
| 234 | 269 | 49 | 340 | 120 | 410 | 190 | 226 |

| 0 | 0 | 0 | 0 | 0 | 0 | 225 | 0 |
|---|---|---|---|---|---|---|---|
| 0 | 0 | 0 | 0 | 0 | 0 | 0 | 0 |
| 0 | 255 | 0 | 0 | 255 | 0 | 0 | 0 |
| 0 | 0 | 0 | 255 | 0 | 0 | 255 | 0 |
| 255 | 0 | 0 | 255 | 0 | 255 | 0 | 0 |
| 255 | 0 | 255 | 0 | 255 | 0 | 255 | 0 |
| 255 | 0 | 0 | 255 | 0 | 255 | 255 | 255 |
| 0 | 255 | 0 | 255 | 255 | 0 | 255 | 255 |
| 255 | 0 | 255 | 255 | 255 | 255 | 255 | 255 |
| 0 | 255 | 255 | 0 | 255 | 255 | 255 | 255 |
| 255 | 255 | 255 | 255 | 255 | 255 | 255 | 255 |

| 0 | 3 | 6 | 9 | 12 | 15 | -237 | 21 |
|---|---|---|---|---|---|---|---|
| 23 | 26 | 29 | 32 | 35 | 38 | 41 | 44 |
| 47 | -205 | 53 | 56 | -196 | 62 | 64 | 67 |
| 70 | 73 | 76 | -176 | 82 | 85 | -167 | 91 |
| -161 | 97 | 100 | -152 | 106 | -147 | 111 | 114 |
| -138 | 120 | -132 | 126 | -126 | 132 | -120 | 138 |
| -114 | 144 | 147 | -106 | 152 | -100 | -97 | -94 |
| 164 | -88 | 170 | -82 | -79 | 179 | -73 | -70 |
| -67 | 191 | -62 | -59 | -56 | -53 | -50 | -47 |
| 211 | -41 | -38 | 220 | -32 | -29 | -26 | -23 |
| -21- | -18 | -15 | -12 | -9 | -6- | -3 | 0 |

| 226 | 196 | 167 | 138 | 109 | 79 | -205 | 21 |
|---|---|---|---|---|---|---|---|
| 252 | 222 | 293 | 164 | 135 | 105 | 76 | 47 |
| 279 | -6 | 220 | 191 | -93 | 132 | 102 | 73 |
| 314 | 275 | 246 | -38 | 188 | 158 | -126 | 100 |
| 76 | 302 | 273 | -11 | 214 | -71 | 155 | 126 |
| 102 | 328 | 44 | 270 | -15 | 211 | -73 | 153 |
| 29 | 355 | 326 | 37 | 266 | -18 | -47 | -76 |
| 410 | 126 | 352 | 67 | 38 | 264 | -20 | -49 |
| 182 | 408 | 123 | 93 | 64 | 35 | 6 | -24 |
| 463 | 179 | 150 | 375 | 91 | 62 | 33 | 3 |
| 234 | 205 | 176 | 146 | 117 | 88 | 59 | 29 |

| 255 | 255 | 0 | 255 | 0 | 255 | 0 | 0 |
|-----|-----|-----|-----|-----|-----|-----|-----|
| 0 | 255 | 255 | 255 | 0 | 0 | 255 | 0 |
| 255 | 0 | 255 | 255 | 0 | 0 | 0 | 0 |
| 255 | 255 | 255 | 255 | 0 | 255 | 0 | 0 |
| 0 | 255 | 255 | 0 | 255 | 0 | 255 | 0 |
| 0 | 255 | 255 | 255 | 0 | 255 | 0 | 0 |
| 0 | 255 | 255 | 255 | 255 | 0 | 0 | 0 |
| 255 | 255 | 255 | 0 | 0 | 255 | 0 | 0 |
| 255 | 255 | 255 | 0 | 255 | 0 | 0 | 0 |
| 255 | 255 | 255 | 255 | 255 | 0 | 0 | 0 |
| 255 | 255 | 0 | 255 | 0 | 255 | 0 | 0 |

| 1 | 1 | 1 | 1 | 1 | 1 | 1 | 1 |
|---|---|---|---|---|---|---|---|
| 1 | 0 | 1 | 1 | 1 | 1 | 1 | 1 |
| 0 | 1 | 1 | 1 | 1 | 0 | 1 | 1 |
| 1 | 0 | 1 | 1 | 0 | 1 | 1 | 0 |
| 1 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 0 |
| 1 | 0 | 0 | 1 | 0 | 0 | 1 | 0 |
| 0 | 0 | 1 | 0 | 0 | 0 | 0 | 1 |
| 0 | 0 | 0 | 0 | 0 | 0 | 1 | 0 |
| 0 | 0 | 0 | 0 | 0 | 0 | 0 | 0 |

| 0 | 0 | 1 | 0 | 1 | 1 | 0 | 1 |
|---|---|---|---|---|---|---|---|
| 0 | 1 | 1 | 0 | 0 | 1 | 1 | 1 |
| 0 | 0 | 1 | 0 | 0 | 1 | 1 | 1 |
| 0 | 1 | 0 | 0 | 1 | 1 | 0 | 1 |
| 0 | 0 | 1 | 0 | 1 | 0 | 1 | 1 |
| 0 | 0 | 0 | 1 | 0 | 1 | 1 | 1 |
| 0 | 0 | 1 | 0 | 1 | 0 | 1 | 1 |
| 0 | 0 | 1 | 0 | 1 | 1 | 0 | 1 |
| 0 | 1 | 0 | 0 | 0 | 1 | 1 | 0 |
| 1 | 0 | 0 | 1 | 0 | 1 | 0 | 1 |
| 0 | 0 | 1 | 0 | 1 | 0 | 1 | 1 |

*144*

| 1 | 1 | 0 | 1 | 0 | 1 | 0 | 0 |
|---|---|---|---|---|---|---|---|
| 0 | 1 | 1 | 1 | 0 | 0 | 1 | 0 |
| 1 | 0 | 1 | 1 | 0 | 0 | 0 | 0 |
| 1 | 1 | 1 | 1 | 0 | 1 | 0 | 0 |
| 0 | 1 | 1 | 0 | 1 | 0 | 1 | 0 |
| 0 | 1 | 1 | 1 | 0 | 1 | 0 | 0 |
| 0 | 1 | 1 | 1 | 1 | 0 | 0 | 0 |
| 1 | 1 | 1 | 0 | 0 | 1 | 0 | 0 |
| 1 | 1 | 1 | 0 | 1 | 0 | 0 | 0 |
| 1 | 1 | 1 | 1 | 1 | 0 | 0 | 0 |
| 1 | 1 | 0 | 1 | 0 | 1 | 0 | 0 |

*134*

| 0 | 0 | 0 | 0 | 0 | 0 | 1 | 0 |
|---|---|---|---|---|---|---|---|
| 0 | 0 | 0 | 0 | 0 | 0 | 0 | 0 |
| 0 | 1 | 0 | 0 | 1 | 0 | 0 | 0 |
| 0 | 0 | 0 | 1 | 0 | 0 | 1 | 0 |
| 1 | 0 | 0 | 1 | 0 | 1 | 0 | 0 |
| 1 | 0 | 1 | 0 | 1 | 0 | 1 | 0 |
| 1 | 0 | 0 | 1 | 0 | 1 | 1 | 1 |
| 0 | 1 | 0 | 1 | 1 | 0 | 1 | 1 |
| 1 | 0 | 1 | 1 | 1 | 1 | 1 | 1 |
| 0 | 1 | 1 | 0 | 1 | 1 | 1 | 1 |
| 1 | 1 | 1 | 1 | 1 | 1 | 1 | 1 |

FIG. 13

| | | | | | | | |
|---|---|---|---|---|---|---|---|
| KY | KY | KM | KY | KM | KM | KY | KM |
| KM | CY | KY | KM | KY | KM | KM | KM |
| CY | KY | KY | KM | KM | CY | KM | KM |
| KY | CY | KM | KY | MC | KY | KM | MC |
| KY | KM | CY | KY | MC | KM | CY | KM |
| KY | MC | KY | CY | KM | MC | KY | MC |
| CY | KM | CY | KY | MC | KM | CY | MC |
| KY | CY | MC | KY | MC | CY | KM | MC |
| CY | CY | KM | CY | CY | MC | MC | KM |
| CY | CY | CY | MC | CY | MC | KM | CY |
| CY | MC | CY | CY | MC | CY | MC | MC |

FIG. 14

SYSTEMS AND METHODS FOR HALFTONING MULTIPLE COLOR SEPARATION LAYERS BY INTERLAYER ERROR DIFFUSION

BACKGROUND OF THE INVENTION

1. Field of Invention

This invention relates to error diffusion and threshold array halftoning of continuous tone data having multiple color separation layers.

2. Description of Related Art

Threshold array halftoning systems and methods and various different types of error diffusion halftoning systems and methods are commonly used to convert continuous tone grayscale, highlight color, and/or full color image data into binary image data suitable for printing and usable by image forming devices that use binary marking technologies. Such binary marking technologies include various types of xerographic laser printers and digital copiers, various types of ink jet printers and other fluid ejection systems, and the like.

In general, black and white, or pure grayscale images, comprise a single color separation layer that uses a single colorant, often black, to create an image. In highlight color, two or three colorants, one of which is usually black, are combined to generate a number of primary and secondary colors. However, highlight colors do not cover the full spectrum or gamut of colors that can be sensed by the human visual system. In contrast, full color systems include three or more different colorants that allow the full spectrum of perceptible colors to be represented.

In highlight color and full color continuous tone images, the various colorants can be divided into separate color separation layers. In each color separation layer, the image value for a particular pixel for a particular colorant is allowed to vary between a first, or "no color", value, representing no colorant, and a maximum, or "full color", value representing a maximum amount of colorant. For such continuous tone images, the image values between the full color value and the no value are allowed to vary effectively continuously, due to the large number of discrete values for the amount of colorant, where the difference between any two adjacent values is relatively small. For example, many continuous tone images define 256 levels of colorant between zero and 255. In general, zero represents no color, while 255 represents the full color, i.e., the maximum amount of colorant that can be applied to an image receiving medium for a given pixel of the image.

Traditionally, in simple error diffusion halftoning systems and methods, as well as in simple threshold array halftoning systems and methods, each color separation layer in a continuous tone highlight or full color image is halftoned independently of the other color separation layers. Such scalar error diffusion techniques are described in, for example, "An Adaptive Algorithm for Spatial Grayscale", by R. Floyd et al., Proceedings of the Society of Information Display, Vol. 17, pp. 75–77 (1976), incorporated herein by reference in its entirety. Several advances have been made in improving the quality of halftones from scalar error diffusion techniques, including schemes that process the data in multiple passes. One example of such as system is described in, "On the Phase Response of the Error Diffusion Filter for Image Halftoning," by A. Kumar et al., IEEE Transactions on Image Processing, Vol. 8, no. 9, pp. 1282–1292 (September, 1999).

However, applying such simple scalar error diffusion to each color separation layer independently of the other color separation layers often results in noisy or artifact-laden images. For example, a light blue region can be produced by combining magenta and cyan pixels of a cyan-yellow-magenta-black (CMYK) image. In this case, each of the colorants cyan, yellow, magenta and black are provided in different color separation layers. However, if the magenta and cyan color separation layers are processed independently, then some pixels in the resulting halftone full color image within the light blue region may have both the magenta and cyan pixels on in the corresponding color separation layers. This yields the color blue at these pixels in the full color image obtained when these color separation layers are superimposed. However, other pixels may have no color at all, resulting in white pixels. Other pixels may have only cyan or may have only magenta. This mixture of white pixels, blue pixels, magenta pixels and cyan pixels will have more contrast and will look noisier than pixels that are purely combinations of magenta and cyan.

Similarly, with threshold array halftoning techniques, each pixel in the original continuous tone image is divided into a plurality of higher resolution pixels in the halftone image. Each of these higher resolution pixels has a different threshold value associated with it. Depending on the original continuous tone image value for a given pixel in the input image, those higher resolution pixels in the output image that have threshold values less than that continuous tone image value will be turned on, while those pixels having threshold values higher than the input image value will not be turned on.

In this way, the amount of colorant between output pixels provided with a full amount of color and output pixels provided with no color is averaged to closely approximate the amount of color in the original continuous tone image. To provide for different color separation layers, each color separation layer is often provided with a different set of parameters for the threshold array halftone cell. These parameters can include frequency, size and/or angle. As a result, like the simple error diffusion systems and methods described above, for a light blue continuous tone input image pixel, the resulting higher resolution output pixels can be combinations of white, magenta only, cyan only, and magenta and cyan pixels, again resulting in unnecessary contrast and noise.

Conventionally, to reduce the effects of this lowered image quality, vector error diffusion systems and methods, such as those disclosed in Venable et al., "Selection and Use of Small Color Sets for Pictorial Display", Proceedings of the IS&T Annual Meeting, Rochester (1990) and in Miller et al., "Color Halftoning Using Error Diffusion and a Human Visual System Model", Proceedings of the IS&T Annual Meeting, Rochester (1990), each incorporated herein by reference in its entirety, have been used in place of scalar error diffusion. In vector error diffusion, as opposed to scalar error diffusion, each color in the input image data is treated as a point in a three-dimensional color space. That is, the color separation layers are not treated independently, but are completely interrelated when determining a single error-diffused three-dimensional halftone color value. However, such vector error diffusion requires extensive computational processing power and other resources to find the closest three-dimensional halftone color value for each input pixel. Additionally, such vector error diffusion is unstable for ideal colors that are near the boundary of an available color gamut that is provided by the intended image rendering device.

In an attempt to solve these difficulties in vector error diffusion, U.S. Pat. No. 6,072,591 and U.S. patent application Ser. No. 09/487,543, each incorporated herein by reference in its entirety, disclose systems that modify vector error diffusion techniques by minimizing errors using the sum and differences of the colors. In these methods, vector error diffusion is only carried out on three channels using a simple decision tree to select the output color at each pixel.

Similarly, in U.S. Pat. No. 6,157,462, incorporated herein by reference in its entirety, after a continuous tone black color separation layer is converted to a halftone black; color separation layer using error diffusion halftoning, the resulting halftone black color separation layer is subsequently combined with each of the other color separation layers of a highlight color or full color continuous tone image to generate modified continuous tone separation layers for the remaining colors. Each of these modified continuous tone separation layers is then converted to a halftone color separation layer using standard error diffusion techniques.

SUMMARY OF THE INVENTION

As outlined above, scalar error diffusion provides no linkage between the different color separation layers as error diffusion halftoning is applied to the continuous tone highlight or full color image. In contrast, vector error diffusion attempts to operate on all of the color separation layers at the same time, making the error diffusion process highly computationally intensive. The process disclosed in the 462 patent biases the remaining color separation layers based on the resulting black halftone data.

However, none of these systems disclose error diffusion halftoning systems iffy and methods that propagate the error both within a color separation layer and between the color separation layer being halftoned and the subsequent color separation layers yet to be halftoned. Moreover, none of these systems even approach diffusing error between color separation layers that have been halftoned using a threshold array.

This invention provides systems and methods that determine the error between a continuous tone color separation layer and the corresponding halftoned color separation layer.

This invention separately provides systems and methods that distribute the error between a continuous tone color separation layer and a corresponding halftone color separation layer to one or more continuous tone color separation layers that have not yet been halftoned.

This invention separately provides systems and methods that use weighting factors that controllably distribute the error between a continuous tone color separation layer and a corresponding halftone color separation layer to one or more continuous tone color separation layers yet to be halftoned.

This invention separately provides systems and methods that threshold-array halftone a color separation layer and generate an error separation layer representing the error between the continuous tone image data and the threshold-array halftoned color separation layer.

This invention separately provides systems and methods that threshold-array halftone a color separation layer, generate an error layer representing the difference between the continuous tone color separation layer and the corresponding threshold-array color separation layer, and combine the error layer with at least one continuous tone color separation layer to be halftoned.

This invention separately provides systems and methods that threshold-array halftone a continuous tone color separation layer, generate an error separation layer representing the difference between the continuous tone color separation layer and the threshold-array halftoned color separation layer, combine the error separation layer with at least one subsequent continuous tone color separation layer and generate a modified continuous tone color separation layer using a multi-level error diffusion process.

This invention separately provides systems and methods that generate a modified continuous tone color separation layer based on the difference between a previously-halftoned color separation layer and a halftone color separation layer corresponding to that previously-halftoned color separation layer.

This invention separately provides systems and methods that distribute a difference between a first color separation layer and the corresponding halftoned color separation layer to at least one other continuous tone color separation layer based on at least one corresponding weighting factor.

In various exemplary embodiments of the systems and methods according to this invention, a highlight color or full color continuous tone image is separated into a plurality of separate color separation layers. Then, a plurality of weighting factors are selected. The weighting factor controls how error is diffused to subsequent color separation layers as each color separation layer is halftoned. Next, a first one of the color separation layers is converted to a halftone color separation layer using an error diffusion or threshold array halftoning process. Then, an error separation layer is generated from the original continuous tone image data and the halftone image data. In various exemplary embodiments, the error is determined on a pixel-by-pixel basis. In various exemplary embodiments, the error separation layer represents, for each pixel, the difference between the continuous tone image value for that pixel and the resulting halftone image value.

Then, a second color separation layer, that has not already been halftoned, is selected. A modified second continuous tone color separation layer is generated from the second continuous tone color separation layer and at least one of the error separation layers for at least one of the previous halftoned color separation layers and the weighting factors corresponding to those error separation layers. That second modified continuous tone color separation layer is then halftoned and a corresponding error separation layer is generated as outlined above. This process is then repeated until the last color separation layer is modified and halftoned as outlined above.

In various exemplary embodiments, the first continuous tone color separation layer, and each of the subsequent modified continuous tone separation layer, are halftone using an error diffusion halftone technique. In various other exemplary embodiments, the first continuous tone color separation layer, and each of the subsequent modified continuous tone color separation layers, are halftoned using a threshold array halftoning technique. In this case, to generate the modified continuous tone color separation layer after the original continuous tone color separation layer is modified by combining one or more of the weighted error separation layers, the initially-modified continuous tone color separation layer is further modified by applying a multilayer error diffusion technique to it.

In various exemplary embodiments, the various one of the plurality of color separation layers are ordered and halftoned in order of decreasing luminous modulation.

In various exemplary embodiments, the weighting factors are selected to favor "dot-on-dot" or "dot-off-dot" halftoning. In various exemplary embodiments, positive weights tend to favor "dot-off-dot" halftone that results in a more disperse coloring distribution". In various exemplary embodiments, negative weighting factor tends to favor "doton-dot" halftone images. In various exemplary embodiments, by selectively setting some of the weighting factors to zero, a more linear process, where all of the error values are combined with the immediately subsequent color separation layer, is obtained. In various other exemplary embodiments, by having a plurality of non-zero weighting factors, the error is distributed among a plurality of subsequent color separation layers to be halftone.

In various exemplary embodiments, rather than separating the multi-color continuous tone image data into separate color separation layers, and then processing each color separation layer to completion, as outlined above, each pixel of the continuous tone image is selected in turn. Each color is then selected in turn based on a desired order of the colors. The first color of the current pixel is then halftoned as outlined above. The halftone error is then error diffused to the surrounding pixels to adjust the image values of these pixels for the current color. Then an error value between the halftone value and the original image value for the current pixel, excluding any earlier error diffusion adjustments, is determined. Based on the weighting factors, this error value is distributed to one or more of the subsequent colors to be halftoned for this current pixel. This is repeated for each of the other colors of the current pixel.

These and other features and advantages of this invention are described in common, or apparent from, the following detailed description of various exemplary embodiments of the systems and methods according to this invention.

BRIEF DESCRIPTION OF THE DRAWINGS

Various exemplary embodiments of the systems and methods of this invention will be described in detailed, with reference to the following figures, wherein:

FIG. 1 shows the continuous tone image data for four color separation layers of a continuous tone full color image;

FIG. 2 illustrates one exemplary embodiment of the halftone color separation layer for a first one of the color separation layers of FIG. 1 generated using error diffusion;

FIG. 3 illustrates one exemplary embodiment of the error separation layer generated from the first color separation layer of FIG. 1 and the corresponding halftone layer shown in FIG. 2;

FIG. 4 illustrates one exemplary embodiment of a modified second continuous tone color separation layer generated from a second one of the color separation layer shown in FIG. 1 and the error separation layer shown in FIG. 3;

FIG. 5 illustrates one exemplary embodiment of the second halftone color separation layer generated from the modified continuous tone color separation layer shown in FIG. 4;

FIG. 6 is one exemplary embodiment of the error separation layer corresponding to the second continuous tone color separation layer shown in FIG. 1 and the second halftone color separation layer shown in FIG. 5;

FIG. 7 illustrates one exemplary embodiment of a modified third continuous tone color separation layer generating from a third one of the continuous tone color separation layer shown in FIG. 1 and the second error separation layer shown in FIG. 6;

FIG. 8 illustrates one exemplary embodiment of a third halftone color separation layer generated from the modified third continuous tone color separation layer shown in FIG. 7;

FIG. 9 illustrates one exemplary embodiment of the third error separation layer generated from the third one of the continuous tone color separation layers shown in FIG. 1 and the third halftone color separation layer shown in FIG. 8;

FIG. 10 illustrates one exemplary embodiment of a modified fourth color separation layer generated from the fourth one of the continuous tone color separation layers shown in FIG. 1 and the third error separation layer shown in FIG. 9;

FIG. 11 illustrates one exemplary embodiment of the halftone fourth color separation layer generated from the modified fourth color separation layer shown in FIG. 10;

FIG. 12 illustrates one exemplary embodiment of the color separation layers shown in FIG. 1 after conventional error diffusion halftoning;

FIG. 13 illustrates one exemplary embodiment of the color separation layers shown in FIG. 1 after halftoning according to the systems and methods of this invention;

FIG. 14 shows a resulting full color halftone image corresponding to the halftone data shown in FIG. 12, illustrating the distribution of colors in the halftone image;

DETAILED DESCRIPTION OF EXEMPLARY EMBODIMENTS

Figure 15:
FIG. 15 shows a full color halftone image corresponding to the halftone data shown in FIG. 13, illustrating the distribution of colors in the halftone image.

The systems and methods according to this invention are directed to generating halftone images from highlight color or full color continuous tone images. The systems and methods of this invention are equally usable with both error diffusion halftoning and threshold array halftoning. For ease of understanding, FIGS. 2–11 illustrate one exemplary embodiment of error diffusion halftoning according to the systems and methods of this invention. In particular, the error diffusion technique used in generating the exemplary image data shown in FIGS. 2–11 uses a simplified error diffusion process where the entire error in converting the continuous tone image value of a current pixel to a halftone value is added to the pixel immediately to the right of the current pixel, or to the first pixel of the subsequent row if the current pixel is the last pixel of a current row.

It should be understood that such a simplified error diffusion technique does not generally result in an esthetically pleasing or high quality image. Nonetheless, this simplified error diffusion technique allows the propagation of the error between the various pixels of the images to be easily followed. Thus, this simplified error diffusion technique is used for illustrative purposes only. It should be appreciated that, in various other exemplary embodiments, more sophisticated error diffusion techniques will be used to diffuse the error between a plurality of the unprocessed pixels surrounding the current pixel being processed.

FIG. 1 shows one exemplary embodiment of a full color image 100 comprising a plurality of separate continuous tone color separation layers 110, 120, 130 and 140. Each of the continuous tone color separation layers 110–140 comprises a plurality of individual pixels 102. For ease of illustration, the four continuous tone color separation layers of the full color continuous tone image 100 are shown offset from each other. In actuality, to produce a full color image on a sheet of recording media corresponding to the continuous tone full color image 100, each of the continuous tone color separation layers 110, 120, 130 and 140 would be placed in overlapping registration, such that each of the pixels of the continuous tone color separation layer 110 would be aligned and overlapped by the corresponding pixels in the other continuous tone color separation layers 120, 130 and 140.

In the exemplary continuous tone full color image 100 shown in FIG. 1, the four continuous tone color separation layers 110–140 correspond to a black continuous tone color separation layer K, a magenta continuous tone color separation layer M, a cyan continuous tone color separation layer C, and a yellow continuous tone color separation layer Y, respectively. However, it should be appreciated that any continuous tone full color image 100 that uses continuous tone color separation layers different from, or in addition to, the black, magenta, cyan and yellow continuous tone color separation layers 110–140 shown in FIG. 1, could be used with the systems and methods according to this invention. Similarly, rather than the continuous tone full color image 100 shown in FIG. 1, a continuous tone highlight color image that includes the black continuous tone color separation layer 110 and any one or two of the continuous tone color separation layers 120, 130 and/or 140 is also within the scope of this invention. Similarly, any other highlight color image that uses two or more continuous tone color separation layers that do not combine to form a full color image is also within the scope of this invention.

It should be appreciated that, in FIGS. 1–11, the continuous tone data initially ranges from zero, representing white, to 255, representing full color. As such, the error diffusion threshold is set to 127, which represents one-half of the range. Thus, for any initial or modified continuous tone image value of 127 or less, the image value of the corresponding halftone pixel is set to zero and the continuous tone image value of that pixel, which already includes any error-diffused image values carried over from previous pixels, is combined and diffused to the continuous tone next pixel. In contrast, for image values greater than 127, the image value of the halftone pixel is set to 255 and the difference between the continuous tone image value for the pixel, which already includes any error-diffused image values carried over from previous pixels, is reduced by 255 and the result is error diffused to the next pixel. FIG. 2 represents the resulting halftone image data obtained using these thresholds from the black continuous tone color separation layer 110.

FIG. 2 shows one exemplary embodiment of a halftone black color separation layer 112 generated from the black continuous tone color separation layer 110 shown in FIG. 1. In particular, as outlined above, the black halftone color separation layer 112 was generated from the black continuous tone color separation layer 110 using the simplified error diffusion process outlined above.

FIG. 3 is a black error separation layer 114 obtained by comparing, on a pixel-by-pixel basis, the continuous tone image value for each pixel for the black continuous tone color separation layer 110 and the halftone image values for the corresponding pixel in the black halftone color separation layer 112. In particular, for a pixel located at the $m^{th}$ row in the $n^{th}$ column, the image value for the black continuous tone color separation 110 is $i_K(m, n)$. The image value for that pixel for the black halftone color separation layer 112 is $b_K(m, n)$. The error value for that pixel in the error separation layer 114 is thus $d_K(m, n)$, where:

$$d_K(m, n) = i_K(m, n) - b_K(m, n). \quad (1)$$

Thus, as shown in FIG. 3, the error values in the black error separation layer 114 range between +255 and −255.

Once the pixel-by-pixel black error separation layer 114 for the black continuous tone separation layer 110 is determined, the error values of the black error separation layer 114 are distributed among one or more of the remaining color separation layers 120, 130 and/or 140 depending on a set of weighting factors $a_u^v$, where u represents the error separation layer being weighted and v represents the continuous tone color separation layer to which the weighted error separation layer will be added. In the exemplary embodiment shown in FIG. 1, there are three possible weighting factors for the black error separation layer 114, namely $a_K^M$, $a_K^C$, and $a_K^Y$. These weighting factors correspond to the weighted amount of the black error separation layer 14 to be combined on a pixel-by-pixel basis with each of the magenta, cyan and yellow continuous tone color separation layers 120–140 respectively.

It should be appreciated that each of the weighting factors $a_u^v$ can take any real value. In particular, the weighting factors need not sum to one. Negative values for the weighting factors invert the signs on the error values shown in FIG. 3. This tends to cause positive values to be added to the continuous tone image values at the same locations where full-color pixels occur in the black halftone color separation layer. This tends to promote "dot-on-dot" halftone full color images.

In contrast, positive weighting factors cause the image values where the full-color black halftone pixels occur to be reduced, while increasing the image values at locations where the black no-color halftone pixels occur. This tends to promote "dot-off-dot" halftone full color images. If the weighting factor is zero, the black color separation layer 114 is not combined with the corresponding continuous tone color separation layer.

In one exemplary embodiment, the weighting factors $a_K^M$, $a_K^C$, and $a_K^Y$ are each set to one, while all other weighting factors are set to zero. This is generally similar to the disclosure of the incorporated 462 patent. However, the 462 patent does not use any weighting factor, and combines the binary values of the black halftone color separation layer on a pixel-by-pixel basis with the continuous tone color separation layers for the cyan, magenta and yellow separations. In contrast, in this similar exemplary embodiment, the weighting factor is set to one. Moreover, the black error separation layer 114, as weighted, rather than the unweighted binary black halftone color separation layer 112, is combined with the other continuous tone color separation layers, on a pixel-by-pixel basis, for the magenta, cyan and yellow continuous tone color separation layers 120–140.

FIG. 4 shows one exemplary embodiment of the modified magenta continuous tone color separation layer 122 generated by adding the black error separation layer 114 to the magenta continuous tone color separation layer 120 on a pixel-by-pixel basis. In particular, in FIG. 4, a weighting factor $a_K^M$ of 1 was used to generate the modified continuous tone image values. FIG. 5 illustrates the magenta halftone color separation layer 124 obtained by halftoning the modified magenta continuous tone color separation layer 122 using the simplified error diffusion process outlined above.

FIG. 6 illustrates one exemplary embodiment of the magenta error separation layer 126 obtained by subtracting the magenta halftone color separation layer 124 from the original magenta continuous tone color separation layer 120. That is, the magenta error separation layer 126 is not subtracted from the modified magenta continuous tone color separation layer 122. It should be appreciated that, as outlined above, the modified magenta continuous tone color separation layer was generated using a weighting factor $a_K^M$ of 1.

Because only the black continuous tone color separation layer 110 had previously been halftoned according to this process, there are no other error separation layers to be weighted using one of the weighting factors $a_u^v$ according to this invention. However, for the next, cyan, continuous tone color separation layer 130, the weighting factors $a_K^C$ and $a_M^C$ can be set to non-zero values. In this case, depending on the magnitude of the weighting factors $a_K^C$ and $a_M^C$, for non-zero weighting values, some amount of each or both of the values of the black error separation layer 114 and the magenta error separation layer 126 will be combined with the cyan continuous tone color separation layer 130 to generate the modified cyan continuous tone color separation layer 132.

FIG. 7 shows one exemplary embodiment of the modified cyan continuous tone color separation layer 132. In the exemplary embodiment shown in FIG. 7, the modified cyan continuous tone color separation layer 132 is generated by adding in only the magenta error separation layer 126. That is, the black-cyan weighting factor $a_K^C$ is set to zero, while the magenta-cyan weighting factor $a_M^C$ is set to 1.

Then, as shown in FIG. 8, similarly to the black color separation layer 110 and the modified magenta color separation layer 122, the modified cyan continuous tone color separation layer 122 is halftoned using the simplified error diffusion technique outlined above to generate the cyan halftone color separation layer 134. Next, as shown in FIG. 9, the cyan error separation layer 136 is generated by subtracting the cyan halftone separation layer 134 from the original cyan continuous tone color separation layer 130.

FIG. 10 shows one exemplary embodiment of a modified yellow continuous tone color separation layer 142. Similarly to the modified cyan continuous tone color separation layer 132 shown in FIG. 7, the modified yellow continuous tone color separation layer 142 is generated by adding only the unmodified cyan error separation layer 136 to the yellow continuous tone color separation layer 140. That is, similarly to that outlined above with respect to the cyan color separation layer 130, each of the black-yellow and magenta-yellow weighting factors $a_K^Y$ and $a_M^Y$ are set to zero, while the cyan-yellow weighting factor $a_C^Y$ is set to 1.

The modified yellow continuous tone color separation layer 142 is then halftoned using the simplified error diffusion technique outlined above to generate the yellow halftone color separation layer 144, which is shown in FIG. 11. Importantly, because there are no color separation layers left to be processed, it is not necessary to generate a yellow error separation layer. However, if there were additional color separation layers to be halftoned, and the yellow error separation layer were to be combined with such additional continuous tone color separation layers using non-zero yellow weighting factors $a_Y^v$, it would be necessary to generate a yellow error separation layer.

Figure 12:
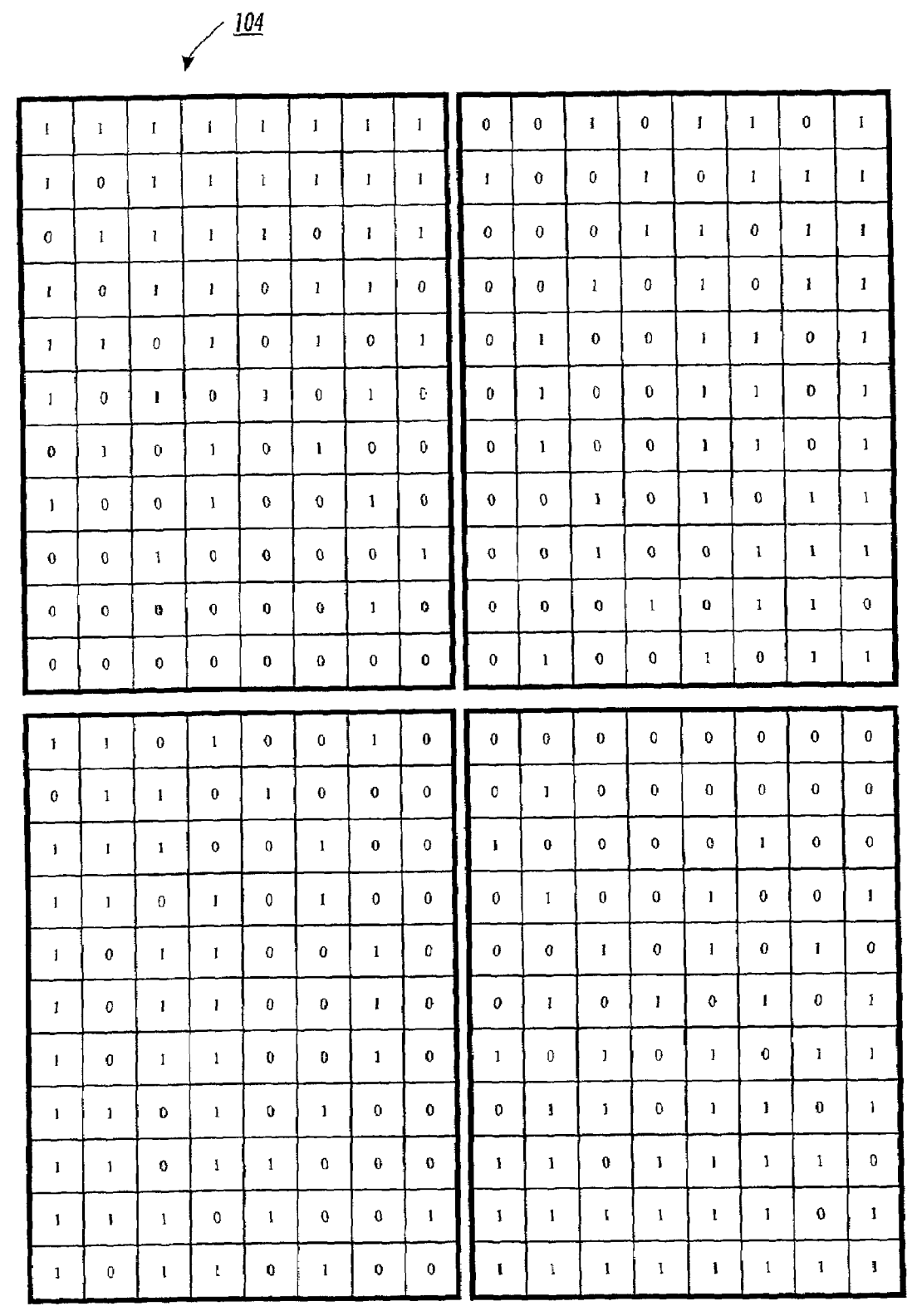

FIG. 12 illustrates a full color halftone image 104 corresponding to the full color continuous tone image 100 shown in FIG. 1 after halftoning each of the color separation layers 110, 120, 130 and 140 independently, as in the conventional error diffusion technique, using the simplified error diffusion method outlined above. In contrast, FIG. 13 illustrates one exemplary embodiment of a halftone full color image 106 according to this invention, comprising the black, magenta, cyan and yellow halftone color separation layers 112, 124, 134 and 144, respectively. In FIGS. 12 and 13, to simplify the understanding of the halftone images, the full-color values of 255 have been replaced by a binary value of 1.

To better appreciate the differences between the conventional halftone full color image 104 shown in FIG. 12 and the halftone full color image 106 generated according to this invention shown in FIG. 13, FIGS. 14 and 15 show corresponding full color images 105 and 107, where the letters "K", "M", "C", and "Y" are placed in the pixels 102 each time a "1" appears in the corresponding black, magenta, cyan or yellow halftone color separation layer shown in FIG. 12 or FIG. 13, respectively. As shown in FIG. 14, in the full color image 105, while each of the black pixels and the cyan pixels are combined with either magenta pixels or yellow pixels, black pixels are never combined with cyan pixels. Likewise, while yellow pixels and magenta pixels are each combined with either black or cyan pixels, magenta pixels are never combined with yellow pixels. Additionally, no pixel contains just one of black, magenta, cyan or yellow pixels. Likewise, no pixel contains any combination of three or more of black, magenta, yellow or cyan pixels.

In contrast, in the full color halftone image 107 generated using one exemplary embodiment of the systems and methods according to this invention, as shown in FIG. 15, each of black, magenta, cyan and yellow pixels occur at some point with all of the other colors. In addition, there are a number of pixels that contain just one of black, yellow, magenta or cyan pixels. Furthermore, some of the pixels contain combinations of black, magenta and cyan pixels, black, magenta and yellow pixels, and black, cyan and yellow pixels. As a result, as shown in FIG. 15, the colors are more evenly distributed and are provided in a greater set of combinations. This generates a less noisy image and one that provides more even transitions between different continuous-valued colors.

Figure 16:
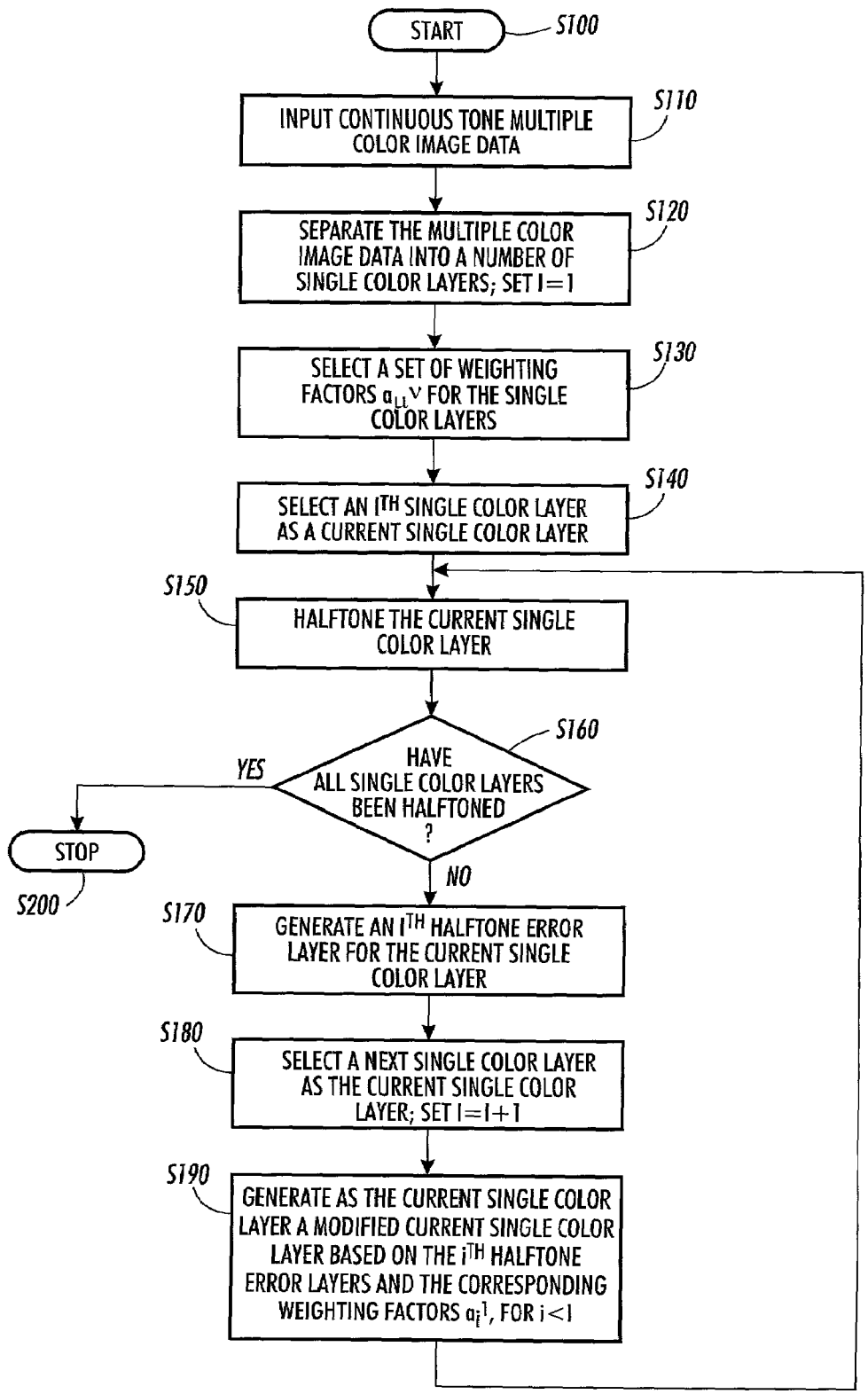
FIG. 16 is a flowchart outlining one exemplary embodiment of a method for inter-layer error diffusion according to this invention.

FIG. 16 is a flowchart outlining one exemplary embodiment of a method for generating halftone full color or highlight color images according to this invention. As shown in FIG. 16, operation begins in step S100, and continues to step S110, where continuous tone multiple color image data is input. It should be appreciated that the multiple color image data can be either highlight color image data or full color image data. Next, in step S120, the multiple color image data is separated into a number of single color separation layers. Also, in step S120, a counter I is set to one. Then, in step S130, a set of weighting factors $a_u^v$ for the single color separation layers generated in step S120 is selected. Operation then continues to step S140.

In step S140, an $I^{th}$ single color separation layer is selected as a current single color separation layer. Then, in step S150, the current single color separation layer is halftoned. It should be appreciated that, as outlined above, the current single color separation layer can be halftoned using either error diffusion or using a threshold array. It should be appreciated that any known or later-developed error diffusion method that operates on a single color separation layer can be used to halftone the current single color layer in step S150. Similarly, it should be appreciated that any known or later-developed method for threshold array halftoning the current single color separation layer can be used in step S150. Next, in step S160, a determination is made whether all of the single color separation layers have been halftoned. If not, operation continues to step S170. Otherwise, operation jumps to step S200.

In step S170, an $I^{th}$ error separation layer for the current single color layer is generated. Next, in step S180, a next single color separation layer is selected as the current single color separation layer. Also, in step S180, the index value I is incremented by one. Then, in step S190, a modified current single color separation layer is generated as the current single color separation layer based on the $i^{th}$ error separation layers and the corresponding weighting factors $a_i^I$, for all i<I. Operation then returns to step S150.

In contrast, in step S160, when all of the single color separation layers have been halftoned, operation continues to step S200, where the operation of the method ends.

It should be appreciated that, in step S190, for the second current single color separation layer, that is, for I=2, the second modified current single color separation layer is based on the first error separation layer and the corresponding first-second weighting factor $a_1^2$. It should be appreciated that the weighting factor $a_1^2$ can be positive, negative or zero, depending on whether the error from the first halftone error layer is to be combined with the second current single color separation layer and if so, if it is to be positively or negatively combined.

For the third single color separation layer, the third modified current single color separation layer is based on the first and/or second error separation layers and the corresponding first-third and second-third weighting factors $a_1^3$ and $a_2^3$. As above, each of the first and second error separation layers may be combined or not with the third current single color separation layer depending on whether the first-third or the second-third weighting factor $a_1^3$ and/or $a_2^3$ is non-zero, and whether the weighting factors are positive and/or negative.

In one variation of the flowchart outlined in FIG. 16, it should be appreciated that, in step S190, if the halftone process used in step S150 is a threshold array process, when generating the modified current single color separation layer from the current single color separation layer based on the $i^{th}$ error layers and the corresponding weighting factors $a_i^I$, after an initial modified current single color separation layer is generated, a multi-level error diffusion process is performed on the initial modified current single color separation layer to generate the final modified current single color separation layer. This is done to ensure that the range of the modified current single color separation layer extends only between the range of thresholds included in the halftone screen, which typically range from the no-color value, such as zero, to the full-color value, such as 255.

That is, after the modified current single color separation layer is generated, such as those shown in FIGS. 4, 7 and 10, the modified image values for particular pixels may be greater than 255 or less than zero. While this is not a problem for error diffusion halftoning, such values cannot be properly threshold array halftoned. Thus, in this case, for those pixels in the modified current single color separation layer that are greater than 255, or any other full-color value that is used, that amount over the full-color value must be error diffused among the adjacent pixels that have not yet been analyzed. Similarly, the amount of image value that is less than zero, or any other no-color value that is used, must also be distributed to pixels which have not yet been analyzed for those pixels of the modified current single color separation layer that have image values less than zero. In this case, the image value for any such pixels that are greater than the full-color value are set to the full-color value, while any such pixels that are less than the no-color value, i.e., zero, are set to the no-color value.

Figure 17:
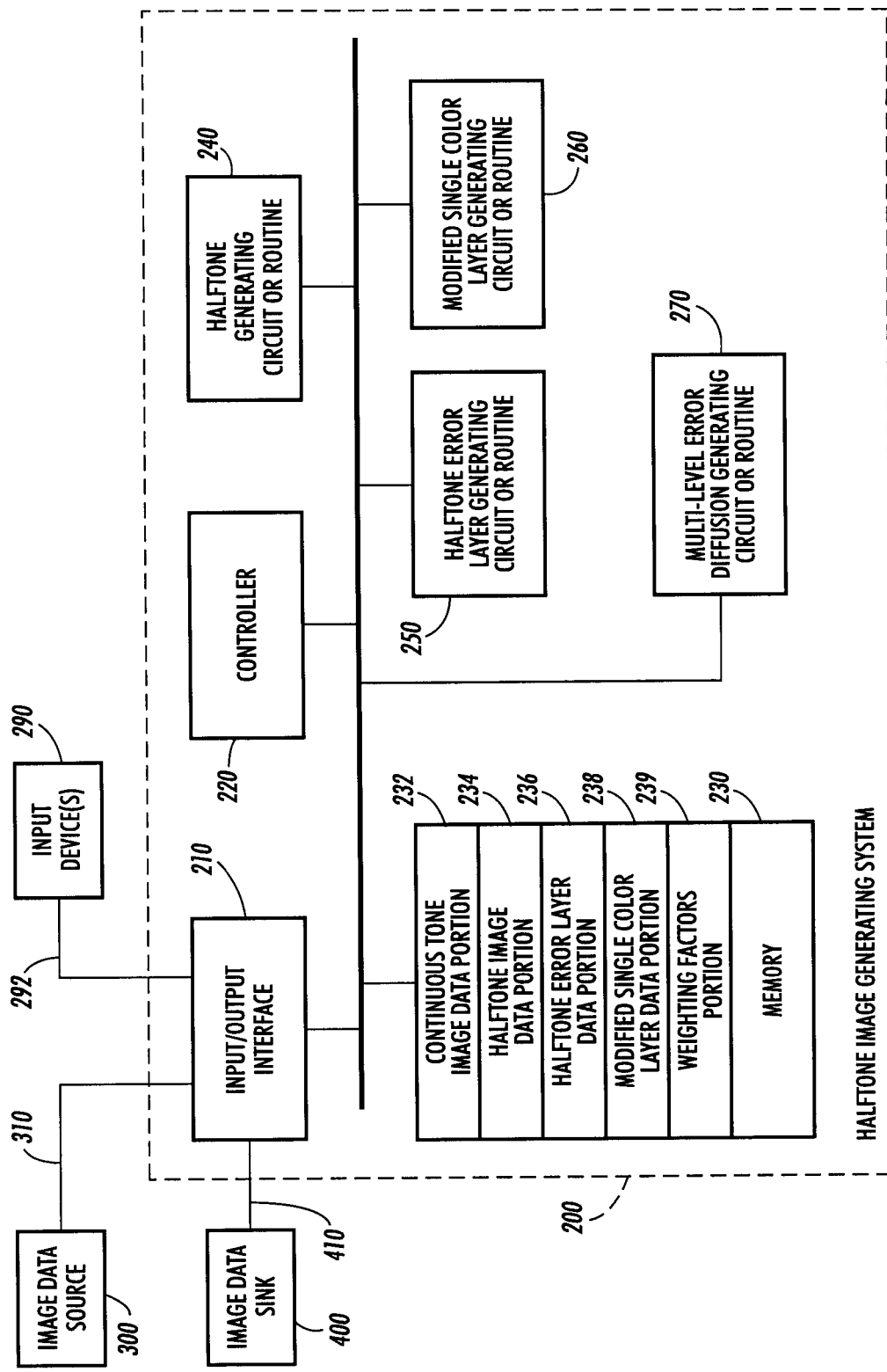
FIG. 17 is a block diagram outlining a first exemplary embodiment of a halftone image generating system according to this invention.

FIG. 17 is a block diagram illustrating a first exemplary embodiment of a halftone image generating system according to this invention. As shown in FIG. 17, the halftone image generating system 200 includes an input/output interface 210, a controller 220, a memory 230, a halftone generating circuit or routine 240, a halftone error layer generating circuit or routine 250, a modified single color layer generating circuit or routine 260 and, optionally, a multi-level error diffusion generating circuit or routine 270. Additionally, as shown in FIG. 17, an image data source 300, an image data sink 400 and one or more input devices 290 can be connected to the halftone image generating system 200 through the input/output interface 210 by links 310, 410 and 292, respectively.

The image data source 300 can be a digital camera, a scanner, or a locally or remotely located computer, or any other known or later-developed device that is capable of generating continuous tone electronic image data. Similarly, the image data source 300 can be any suitable device that stores and/or transmits continuous tone electronic image data, such as a client or a server of a network. The image data source 300 can be integrated with the halftone image generating system 200, as in a digital copier having an integrated scanner. Alternatively, the image data source 300 can be connected to the halftone image generating system 200 over a connection device, such as a modem, a local area network, a wide area network, an intranet, the Internet, any other distributed processing network, or any other known or later-developed connection device.

It should also be appreciated that, while the continuous tone electronic image data can be generated at the time of printing an image from an original physical document, the electronic image data could have been generated at any time in the past. Moreover, the electronic image data need not have been generated from the original physical document, but could have been created from scratch electronically. The image data source 300 is thus any known or later-developed device which is capable of supplying electronic image data over the link 310 to the halftone image generating system 200.

Thus, while FIG. 17 shows the halftone image generating system 200 as a separate device from the image data source 300, the halftone image generating system 200 may be an integrated device, such as a digital copier, a computer with a built-in printer, or any other integrated device that is capable of producing a hard copy image output. With such a configuration, for example, the image data source 300, the halftone image generating system 200, and the image data sink 400 may be contained within a single device. Similarly, the image data sink 400 can be any known or later-developed device that is capable of receiving the halftone image data output by the halftone image generating system 200 and either storing, transmitting, or displaying the halftone image data. The storage device can be any known structural apparatus for indefinitely storing the enhanced image data, such as a RAM, a hard drive and disk, a floppy drive and disk, an optical drive and disk, a flash memory or the like.

Alternatively, the halftone image generating system 200 may be a separate device containing the image data source attachable upstream of a stand-alone image data sink 400, such as a hard copy output device. For example, the halftone image generating system 200 may be incorporated into a network print server that manages printer data for a plurality of the same or different printer devices. Furthermore, the halftone image generating system 200 may be implemented as software on the image data source 300 or the image data sink 400. Other configurations of the elements shown in FIG. 17 may be used without departing from the spirit and scope of this invention.

When the image data source 300 is a personal computer, the link 310 connecting the image data source 300 to the halftone image generating system 200 can be a direct cable connection between the personal computer and the halftone image generating system 200. The link 210 can also be a local area network, a wide area network, the Internet, an intranet, or any other distributed processing and storage network. Moreover, the link 210 can also be a wireless link between the image data source 300 and the halftone image generating system 200. Accordingly, it should be appreciated that the image data source 300 can be connected using any known or later-developed system that is capable of transmitting data from the image data source 300 to the halftone image generating system 200.

The links 310 and 410 can be thus any known or later-developed device or system, including a direct cable connection, a connection over a public switched telephone network, a connection over a wide area network or a local area network, a connection over an intranet or an extranet, a connection over the Internet, or a connection over any other distributed processing network or system. In general, the links 310 and 410 can each be any known or later developed connection system or structure usable to connect the image data source 300 or image data sink 400, respectively, to the halftone image generating system 200.

As shown in FIG. 17, the memory 230 can include one or more of a continuous tone image data portion 232, a halftoned image data portion 234, a halftone error data portion 236, a modified single color layer data portion 238 and/or a weighting factors portion 239. The continuous tone image data portion 232 stores the continuous tone image data received from the image data source 300 over the link 310 and input through the input/output interface 210 and, under control of the controller 220, stored in the memory 230. The halftone image data portion 234 stores the halftone image data generated by the halftone generating circuit error routine 240. The halftone error data portion 236 stores the halftone error layers generated from the halftone image data stored in the halftone image data portion 234 and the continuous tone image data stored in the continuous tone image data 232. The modified single color layer data portion 238 stores the modified single color layer data generated based on the continuous tone image data stored in the continuous tone image data portion 232 and the halftone error data stored in the halftone error data portion 236 in view of the weighting factor stored in the weighting factors portion 239.

As shown in FIG. 17, the memory 230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The halftone generated circuit or routine 240 generates halftone image data from either a first continuous tone color separation layer stored in the continuous tone image data portion 232 or subsequent modified color separation layers stored in the modified single color layer data portion 238.

The halftone error layer generating circuit or routine 250 generates the halftone error layers based on the halftone color separation layers stored in the halftone image data portion 234 and the corresponding continuous tone separation layers stored in the continuous tone layer data portion 232. The modified single color layer generating circuit or routine 260 modifies one or more of the halftone error separation layers stored in the halftone error data portion 236 based on the corresponding weighting factors stored in the weighting factors portion 239 and then combines the weighted halftone error separation layers with the corresponding continuous tone separation layer stored in the continuous tone separation image data portion 232.

If the halftone generating circuit or routine 240 uses a threshold array halftoning technique, the multi-level error diffusion generating circuit or routine 270 can optionally be used to further modify the initial current modified single color separation layer stored in the modified single color layer data portion 238 to ensure that the image values do not extend beyond a full-color value or below a no-color value, as outlined above. If the multi-level error diffusion generating circuit error routine 270 is used, it stores the further modified single color separation layer back into the modified single color layer data portion 238 as the data to be used by the halftone generating circuit or routine 240 to generate the next halftone color separation layer.

Once all of the color separation layers stored in the continuous tone image data portion 232 have been converted to halftone color separation layers and stored in the halftone image data portion 234, the full color or highlight color halftone image data is output under control of the controller 220 through the input/output interface 210 and over the link 410 to the image data sink 400.

One exemplary technique for error diffusion halftoning that implements, for a continuous tone cyan-magenta-yellow-black (CMYK) full color image, one exemplary embodiment of the systems and methods according to this invention includes:

1. Separating the continuous tone full color image into separate cyan, magenta, yellow and black continuous tone color separation layers $i_C(m,n)$, $i_M(m,n)$, $i_Y(m,n)$, $i_K(m,n)$.
2. Selecting a number of different weighting factors $a_u^v$, where u and v each refer to one of cyan, magenta, yellow and black (C,M,Y and K). It should be appreciated that one simple choice for the weighting factors is to set $a_u^v=1.0$ for all appropriate values of u and v.
3. Error diffusion halftoning the black (K) color separation layer $i_K(m,n)$ to obtain a binary-valued black (K) halftone separation layer $b_K(m,n)$.
4. Calculating a black (K) error separation layer as $d_K(m,n)=i_K(m,n)-b_K(m,n)$.
5. Calculating a modified magenta color separation layer as $i_M'(m,n)=i_M(m,n)+a_K^M d_K(m,n)$.
6. Error diffusion halftoning the modified magenta color separation layer $i_M'(m,n)$ to obtain a binary-valued magenta (M) halftone separation layer $b_M(m,n)$.
7. Calculating a magenta (M) error separation layer from the original magenta color separation layer as $d_M(m,n)=i_M(m,n)-b_M(m,n)$.
8. Calculating a modified cyan color separation layer as $i_C'(m,n)=i_C(m,n)+a_K^C d_K(m,n)+a_M^C d_M(m,n)$.
9. Error diffusion halftoning the modified cyan color separation layer $i_C'(m,n)$ to obtain a binary-valued cyan (C) halftone separation layer $b_C(m,n)$.
10. Calculating a cyan (C) error separation layer from the original cyan color separation layer as $d_C(m,n)=i_C(m,n)-b_C(m,n)$.

11. Calculating a modified yellow color separation layer as
$i_Y'(m,n) = i_Y(m,n) + a_K^Y d_K(m,n) + a_C^Y d_C(m,n) + a_M^Y d_M(m,n)$; and 12. Error diffusion halftoning the modified yellow color separation layer $i_Y''(m,n)$ to obtain a binary-valued yellow (Y) halftone separation layer $b_Y(m,n)$.

Figure 18:
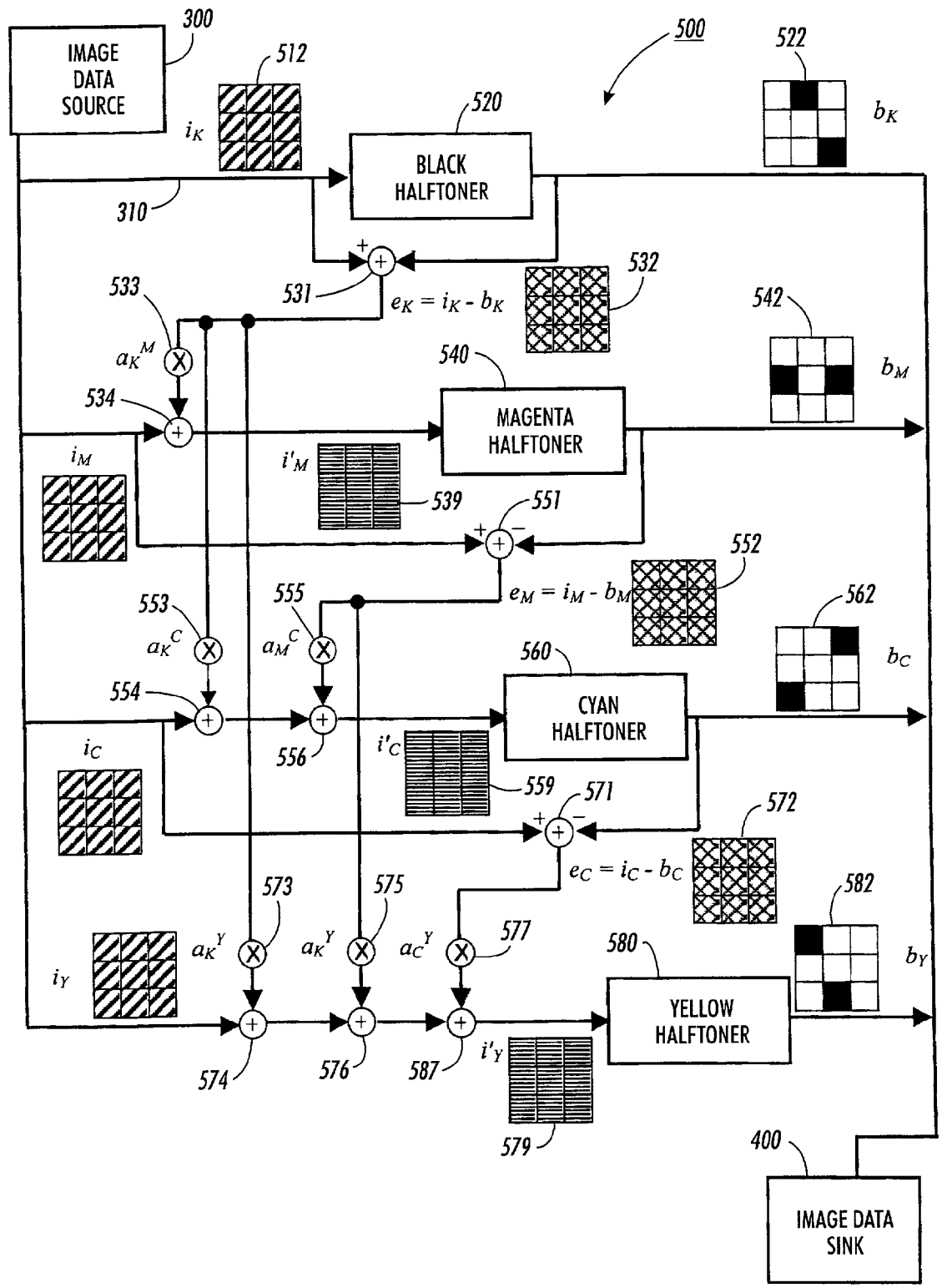
FIG. 18 is a block diagram outlining a second exemplary embodiment of a halftone image generating system according to this invention.

FIG. 18 is a block diagram illustrating a second exemplary embodiment of a halftone image generating system according to this invention that implements this technique. As shown in FIG. 18, the halftone image generating system 500 is connected to the image data source 300 over one or more of the links 310 and is connected to the image data sink over one or more of the links 410. The halftone image generating system 500 inputs a black color separation layer 512, a magenta color separation layer 514, a cyan color separation layer 516 and a yellow color separation layer 518 from the image data source 300.

The halftone image generating system 500 inputs the black color separation layer 512 to a black halftoner 520 and a first adder 531. The black halftoner 520 applies any known or later-developed halftoning process to the black color separation layer 512 to generate a binary-valued black halftone separation layer 522. In various exemplary embodiments, the black halftoner 520 applies an error diffusion halftoning process to the black color separation layer 512 to generate the binary-valued black halftone separation layer 522. The binary-valued black halftone separation layer 522 is then output both to the image data sink 400 and to the first adder 531.

The first adder 531 subtracts the binary-valued black halftone separation layer 522 from the black color separation layer 512 to generate a black error separation layer 532. The first adder 531 outputs the black error separation layer 532 to a first multiplier 533, a second multiplier 553 and a third multiplier 573. The first multiplier 533 multiplies the black error separation layer 532 by a black-magenta weighting factor $a_K^M$. The first multiplier 533 then outputs the black-magenta weighted black error separation layer to a second adder 534. The second multiplier 553 multiplies the black error separation layer 532 by a black-cyan weighting factor $a_K^C$. The second multiplier 553 then outputs this black-cyan weighted black error separation layer to a third adder 554. The third multiplier 573 multiplies the black error separation layer 532 by a black-yellow weighting factor $a_K^Y$. The third multiplier 573 then outputs this black-yellow weighted black error separation layer to a fourth adder 574.

The halftone image generating system 500 inputs the magenta color separation layer 514 to the second adder 534 and a fifth adder 551. The second adder 534 adds the magenta color separation layer 514 to the weighted black-magenta error separation layer from the first multiplier 533 to generate a modified magenta color separation layer 539. The second adder outputs the modified magenta color separation layer 539 to a magenta halftoner 540. The magenta halftoner 540 applies any known or later-developed halftoning process to the modified magenta color separation layer 539 to generate a binary-valued magenta halftone separation layer 542. In various exemplary embodiments, the magenta halftoner applies an error diffusion halftoning process to the modified magenta color separation layer 539 to generate the binary-valued magenta halftone separation layer 542. The binary-valued magenta halftone separation layer 542 is then output both to the image data sink 400 and to the fifth adder 551.

The fifth adder 551 subtracts the binary-valued magenta halftone separation layer 542 from the magenta color separation layer 514 to generate a magenta error separation layer 552. The fifth adder 551 outputs the magenta error separation layer 552 to a fourth multiplier 555 and a fifth multiplier 575. The fourth multiplier 555 multiplies the magenta error separation layer 552 by a magenta-cyan weighting factor $a_M^C$. The fourth multiplier 555 then outputs the magenta-cyan weighted magenta error separation layer to a sixth adder 556. The fifth multiplier 575 multiplies the magenta error separation layer 552 by a magenta-yellow weighting factor $a_M^Y$. The fifth multiplier 575 then outputs this magenta-yellow weighted magenta error separation layer to a seventh adder 576.

The halftone image generating system 500 inputs the cyan color separation layer 516 to the third adder 554 and an eighth adder 571. The third adder 554 adds the cyan color separation layer 516 to the weighted black-cyan error separation layer from the second multiplier 553 and outputs that sum to the sixth adder 556. The sixth adder 556 adds to that sum the weighted magenta-cyan error separation layer from the fourth multiplier 555 to generate a modified cyan color separation layer 559. The sixth adder outputs the modified cyan color separation layer 559 to a cyan halftoner 560.

The cyan halftoner 560 applies any known or later-developed halftoning process to the modified cyan color separation layer 559 to generate a binary-valued cyan halftone separation layer 562. In various exemplary embodiments, the cyan halftoner 560 applies an error diffusion halftoning process to the modified cyan color separation layer 559 to generate the binary-valued cyan halftone separation layer 562. The binary-valued cyan halftone separation layer 562 is then output both to the image data sink 400 and to the eighth adder 571.

The eighth adder 5751 subtracts the binary-valued cyan halftone separation layer 562 from the cyan color separation layer 516 to generate a cyan error separation layer 572. The eighth adder 571 outputs the cyan error separation layer 552 to a sixth multiplier 577. The sixth multiplier 577 multiplies the cyan error separation layer 572 by a cyan-yellow weighting factor $a_C^Y$. The sixth multiplier 577 then outputs this cyan-yellow weighted cyan error separation layer to a ninth adder 578.

The halftone image generating system 500 inputs the yellow color separation layer 518 to the fourth adder 574. The fourth adder 554 adds the yellow color separation layer 518 to the weighted black-yellow error separation layer from the third multiplier 573 and outputs that sum to the seventh adder 576. The seventh adder 576 adds to that sum the weighted magenta-yellow error separation layer from the fifth multiplier 575 and outputs that further sum to the ninth adder 578. The ninth adder 578 adds to that further sum the weighted cyan-yellow error separation layer from the sixth multiplier 577 to generate a modified yellow color separation layer 579. The ninth adder outputs the modified yellow color separation layer 579 to a yellow halftoner 580.

The yellow halftoner 580 applies any known or later-developed halftoning process to the modified cyan color separation layer 579 to generate a binary-valued yellow halftone separation layer 582. In various exemplary embodiments, the cyan halftoner 580 applies an error diffusion halftoning process to the modified yellow color separation layer 579 to generate the binary-valued yellow halftone separation layer 582. The binary-valued yellow halftone separation layer 582 is then output to the image data sink 400.

One exemplary technique for threshold halftoning that implements, for a continuous tone cyan-magenta-yellowblack (CMYK) full color image, one exemplary embodiment of the systems and methods according to this invention includes:

1. Separating the continuous tone full color image into separate cyan, magenta, yellow and black continuous tone color separation layers $i_C(m,n)$, $i_M(m,n)$, $i_Y(m,n)$, $i_K(m,n)$.
2. Selecting a number of different weighting factors $a_u^v$, where u and v each refer to one of cyan, magenta, yellow and black (C,M,Y and K). It should be appreciated that one simple choice for the weighting factors is to set $a_u^v=1.0$ for all appropriate values of u and v.
3. Threshold halftoning the black (K) color separation layer $i_K(m,n)$ to obtain a binary-valued black (K) halftone separation layer $b_K(m,n)$.
4. Calculating a black (K) error separation layer as: $d_K(m,n)=i_K(m,n)-b_K(m,n)$.
5. Calculating a modified magenta color separation layer by:
    a) Computing an initial modified magenta color separation layer as $i_M'(m,n)=i_M(m,n)+a_K^M d_K(m,n)$; and
    b) Performing a multilevel error diffusion with output levels [0,1, . . . 255] on the initial modified magenta color separation layer $i_M'(m,n)$ to obtain a final modified magenta color separation layer $i_M''(m,n)$.
6. Threshold halftoning the final modified magenta color separation layer $i_M''(m,n)$ to obtain a binary-valued magenta (M) halftone separation layer $b_M(m,n)$.
7. Calculating a magenta (M) error separation layer from the original magenta color separation layer as $d_M(m,n)=i_M(m,n)-b_M(m,n)$.
8. Calculating a modified cyan color separation layer by:
    a) Computing an initial modified cyan color separation layer as $i_C'(m,n)=i_C(m,n)+a_K^C d_K(m,n)+a_M^C d_M(m,n)$; and
    b) Performing a multilevel error diffusion with output levels [0,1, . . . 255] on the initial modified cyan color separation layer $i_C'(m,n)$ to obtain a final modified cyan color separation layer $i_C''(m,n)$.
9. Threshold halftoning the final modified cyan color separation layer $i_C''(m,n)$ to obtain a binary-valued cyan (C) halftone separation layer $b_C(m,n)$.
10. Calculating a cyan (C) error separation layer from the original cyan color separation layer as $d_C(m,n)=i_C(m,n)-b_C(m,n)$.
11. Calculating a modified yellow color separation layer by:
    a) Computing an initial modified yellow color separation layer as $i_Y'(m,n)=i_Y(m,n)+a_K^Y d_K(m,n)+a_C^Y d_C(m,n)+a_M^Y d_M(m,n)$; and
    b) Performing a multilevel error diffusion with output levels [0,1, . . . 255] on the initial modified yellow color separation layer $i_Y'(m,n)$ to obtain a final modified yellow color separation layer $i_Y''(m,n)$; and
12. Threshold halftoning the final modified yellow color separation layer $i_Y''(m,n)$ to obtain a binary-valued yellow (Y) halftone separation layer $b_Y(m,n)$.

Figure 19:
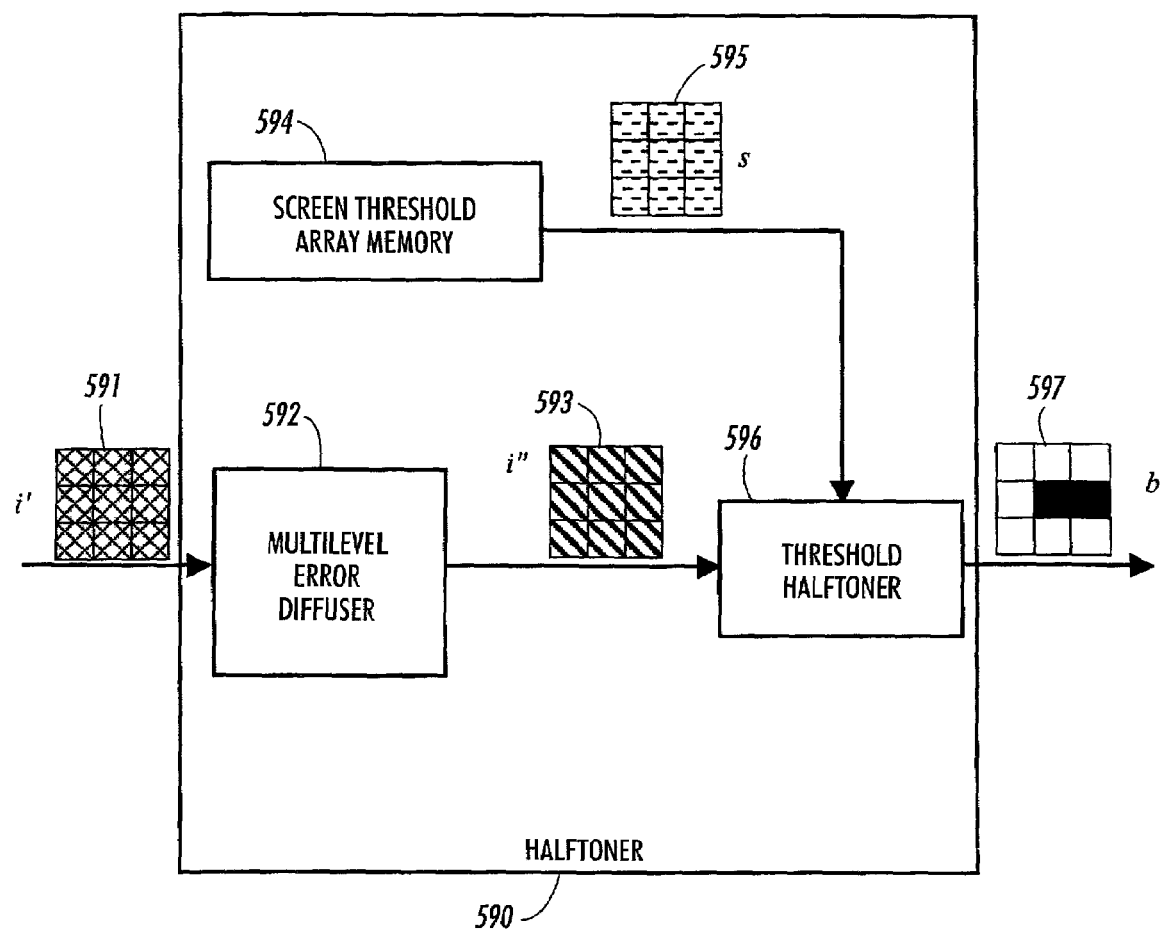
FIG. 19 is a block diagram outlining one exemplary embodiment of the halftoner of FIG. 18 usable for threshold array halftoning according to this invention.

FIG. 19 is a block diagram illustrating one exemplary embodiment of a halftoner, usable with the halftone image generating system shown in FIG. 18, according to this invention that implements this technique. As described above and as shown in FIG. 18, the halftone image generating system 500 is connected to the image data source 300 over one or more of the links 310 and is connected to the image data sink over one or more of the links 410. The halftone image generating system 500 inputs a black color separation layer 512, a magenta color separation layer 514, a cyan color separation layer 516 and a yellow color separation layer 518 from the image data source 300.

FIG. 19 shows an exemplary embodiment of a halftoner 590 that is usable as the magenta, cyan and/or yellow halftoners 540, 560 and/or 580 shown in FIG. 18. As shown in FIG. 19, the halftoner 590 includes a multilevel error diffuser 592, a memory element 594 that stores a screen threshold array 595 and a threshold halftoner 596. A modified color separation layer 591 is input to the multilevel error diffuser 592. The modified color separation layer 591 could be any of the modified magenta, cyan and/or yellow color separation layers 539, 559 and/or 579.

The multilevel error diffuser 592 applies a multilevel error diffusion process to the modified color separation layer 591 to generate a final modified color separation layer 593. As discussed above, the continuous tone image values of the final modified color separation layer 593 are modified to ensure that these continuous tone image values are within the threshold range defined in the screen threshold array 595 stored in the screen threshold array memory 594. The threshold halftoner inputs both the final modified color separation layer 593 and the screen threshold array 595 and generates a threshold-array-halftoned binary-valued halftone color separation layer 597. The threshold-array-halftoned binary-valued halftone color separation layer 597 could be any of the magenta, cyan and/or yellow halftone separation layers 542, 562 and/or 582.

The halftoner 590 is also usable in this exemplary embodiment as the black halftoner 520. However, in this case, since the unmodified black color separation layer 512 is input to the black halftoner 520, the halftoner 590 can omit the multilevel error diffuser 592. As a result, in this case, the halftoner 590 will directly input the unmodified black color separation layer 512 to the threshold halftoner 596 to generate the threshold-array-halftoned binary-valued halftone color separation layer 597 as the binary-valued black halftone separation layer 522.

It should be appreciated that, in the foregoing descriptions of FIGS. 1–19, the systems and methods of this invention have been described with the entire image separated into separate continuous tone separation layers. However, it should be appreciated that the systems and methods according to this invention, such as those described with respect to FIGS. 16–19, can apply the steps outlined in FIG. 16 on a pixel-by-pixel or scanline-by-scanline basis, as outlined above. Thus, it is not necessary to separate the image data into a plurality of color separation layers.

The halftone image generating systems 200 and 500 are each, in various exemplary embodiments, implemented on a programmed general purpose computer. However, the halftone image generating systems 200 and/or 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 16, can be used to implement the halftone image generating systems 200 and/or 500.

Moreover, the halftone image generating systems 200 and 500 can each be implemented as software executing on a programmed general purpose computer, a special purpose computer, a microprocessor or the like. In this case, the halftone image generating systems 200 and/or 500 can be implemented as a routine embedded in a printer driver, as a resource residing on a server, or the like. The halftone image generating systems 200 and/or 500 can also be implemented by physically incorporating it into a software and/or hardware system, such as the hardware and software systems of a printer or a digital photocopier.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for generating a halftone image from a continuous tone image having a plurality of color separation layers, comprising:
    halftoning a first one of the plurality of color separation layers to form a first color halftone separation layer;
    generating a first color error separation layer based on the first color separation layer and the first color halftone separation layer;
    modifying a second one of the plurality of color separation layers to form a modified second color separation layer based on at least the first color error separation layer;
    halftoning the modified second color separation layer to form a second color halftone separation layer;
    generating a second color error separation layer based on the second color separation layer and the second color halftone separation layer;
    modifying a third one of the plurality of color separation layers to form a modified third color separation layer based on at least one of at least the first color error separation layer and the second color error separation layer;
    halftoning the modified third color separation layer to form a third color halftone separation layer;
    generating a third color error separation layer based on the third color separation layer and the third color halftone separation layer;
    modifying a fourth one of the plurality of color separation layers to form a modified fourth color separation layer based on at least one of at least the first color error separation layer, the second color error separation layer, and the third color error separation layer;
    halftoning the modified fourth color separation layer to form a fourth color halftone separation layer;
    generating a fourth color error separation layer based on the fourth color separation layer and the fourth color halftone separation layer;
    modifying the first color separation layer to form a modified first color separation layer based on the entirety of the second color error separation layer, the third color error separation layer, and the fourth color error separation layer; and
    halftoning the modified first color separation layer to form the first color halftone separation layer; and
    displaying the halftone image.

2. The method of claim 1, wherein halftoning the first color separation layer and the modified second color separation layer comprises error diffusion halftoning the first color separation layer and the modified second color separation layer.

3. The method of claim 1, wherein error diffusion halftoning the first color separation layer and the modified second color separation layer comprises scalar error diffusion halftoning the first color separation layer and the modified second color separation layer.

4. The method of claim 1, wherein modifying the third color separation layer comprises:
    weighting the first color error separation layer based on a first weighting factor;
    weighting the second color error separation layer based on a second weighting factor; and
    combining the weighted first and second color error separation layers with the third color separation layer to form the modified third color separation layer.

5. The method of claim 4, wherein at least one of the first and second weighting factors is non-zero.

6. The method of claim 4, wherein weighting the first color error separation layer based on the first weighting factor comprises multiplying the first color error separation layer with a positive first weighting factor to separate active pixels of the first color halftone separation layer from active pixels of the third color halftone separation layer.

7. The method of claim 4, wherein weighting the first color error separation layer based on the first weighting factor comprises multiplying the first color error separation layer with a negative first weighting factor to cause active pixels of the third color halftone separation layer to overlap active pixels of the first color halftone separation layer.

8. The method of claim 4, wherein weighting the second color error separation layer based on the second weighting factor comprises multiplying the second color error separation layer with a positive second weighting factor to separate active pixels of the second color halftone separation layer from active pixels of the third color halftone separation layer.

9. The method of claim 4, wherein weighting the second color error separation layer based on the second weighting factor comprises multiplying the second color error separation layer with a negative second weighting factor to cause active pixels of the third color halftone separation layer to overlap active pixels of the second color halftone separation layer.

10. The method of claim 1, wherein modifying the fourth color separation layer comprises:
    weighting the first color error separation layer based on a first weighting factor;
    weighting the second color error separation layer based on a second weighting factor;
    weighting the third color error separation layer based on a second weighting factor; and
    combining the weighted first, second and third color error separation layers with the fourth color separation layer to form the modified fourth color separation layer.

11. The method of claim 10, wherein at least one of the first, second and third weighting factors is non-zero.

12. The method of claim 10, wherein weighting the first color error separation layer based on the first weighting factor comprises multiplying the first color error separation layer with a positive first weighting factor to separate active pixels of the first color halftone separation layer from active pixels of the fourth color halftone separation layer.

13. The method of claim 10, wherein weighting the first color error separation layer based on the first weighting factor comprises multiplying the first color error separation layer with a negative first weighting factor to cause active pixels of the fourth color halftone separation layer to overlap active pixels of the first color halftone separation layer.

14. The method of claim 10, wherein weighting the second color error separation layer based on the second weighting factor comprises multiplying the second color error separation layer with a positive second weighting factor to separate active pixels of the second color halftone separation layer from active pixels of the fourth color halftone separation layer.

15. The method of claim 10, wherein weighting the second color error separation layer based on the second weighting factor comprises multiplying the second color error separation layer with a negative second weighting factor to cause active pixels of the fourth color halftone separation layer to overlap active pixels of the second color halftone separation layer.

16. The method of claim 10, wherein weighting the third color error separation layer based on the third weighting factor comprises multiplying the third color error separation layer with a positive third weighting factor to separate active pixels of the third color halftone separation layer from active pixels of the fourth color halftone separation layer.

17. The method of claim 10, wherein weighting the third color error separation layer based on the third weighting factor comprises multiplying the third color error separation layer with a negative third weighting factor to cause active pixels of the fourth color halftone separation layer to overlap active pixels of the third color halftone separation layer.

18. The method of claim 1, further comprising combining the first halftone color separation layer, the second halftone color separation layer, the third halftone color separation layer and the fourth halftone color separation layer as the halftone color image.

19. The method of claim 1, further comprising repeating the method of claim 1 a number of times.

20. The method of claim 1, wherein halftoning the first color separation layer and the modified second color separation layer comprises threshold-array halftoning the first color separation layer and the modified second color separation layer.

21. The method of claim 20, wherein threshold-array halftoning the modified second color separation layer comprises:
    performing a multilevel error diffusion on the modified second color separation layer to form a further modified second color separation layer; and
    threshold-array halftoning the further modified second color separation layer.

22. The method of claim 1, wherein modifying the second one of the plurality of color separation layers comprises:
    weighting the first color error separation layer by multiplying the first color error separation layer with a negative weighting factor;
    combining the weighted first color error separation layer with the second one of the plurality of color separation layers to form the modified second color separation layer.

23. A halftone image generating system usable to generate a halftone image from a continuous tone image having a plurality of color separation layers, comprising at least one circuit, comprising:
    a circuit to haltone a first one of the plurality of color separation layers to form a first color halftone separation layer;
    an error layer circuit to generate a first color error separation layer based on the first color separation layer and the first color halftone separation layer;
    a color layer circuit to modify a second one of the plurality of color separation layers to form a modified second color separation layer based on at least the first color error separation layer;
    a circuit to haltone the modified second color separation layer to form a second color halftone separation layer;
    an error layer circuit to generate a second color error separation layer based on the second color separation layer and the second color halftone separation layer;
    a color layer circuit to modify a third one of the plurality of color separation layers to form a modified third color separation layer based on at least one of at least the first color error separation layer and the second color error separation layer;
    a circuit to haltone the modified third color separation layer to form a third color halftone separation layer;
    an error layer circuit to generate a third color error separation layer based on the third color separation layer and the third color halftone separation layer;
    a color layer circuit to modify a fourth one of the plurality of color separation layers to form a modified fourth color separation layer based on at least one of at least the first color error separation layer, the second color error separation layer and the third color error separation layer;
    a circuit to haltone the modified fourth color separation layer to form a fourth color halftone separation layer;
    an error layer circuit to generate a fourth color error separation layer based on the fourth color separation layer and the fourth color halftone separation layer;
    a color layer circuit to modify the first color separation layer to form a modified first color separation layer based on the entirety of the second color error separation layer, the third color error separation layer and the fourth color error separation layer; and
    a circuit to haltone the modified first color separation layer to form the first color halftone separation layer.

* * * * *